United States Patent [19]

Harada et al.

[11] Patent Number: 5,556,910
[45] Date of Patent: * Sep. 17, 1996

[54] POLYPROPYLENE RESIN COMPOSITION

[75] Inventors: Hiroyuki Harada, Ichihara; Yuji Ikezawa, Nagoya; Susumu Kanzaki, Ichihara; Hideo Shinonaga, Chiba; Satoru Sogabe, Sodegaura, all of Japan

[73] Assignee: Sumitomo Chemical Company Limited., Osaka, Japan

[*] Notice: The term of this patent shall not extend beyond the expiration date of Pat. No. 5,462,987.

[21] Appl. No.: 324,603

[22] Filed: Oct. 18, 1994

[30] Foreign Application Priority Data

Oct. 19, 1993 [JP] Japan ................................. 5-261377

[51] Int. Cl.$^6$ ...................... C08K 3/00; C08L 53/00
[52] U.S. Cl. ..................... 524/504; 524/505; 525/71; 525/79; 525/88
[58] Field of Search ............................ 525/71, 79, 323; 524/504, 505

[56] References Cited

U.S. PATENT DOCUMENTS

| | | | |
|---|---|---|---|
| 4,735,988 | 4/1988 | Takada et al. | 524/504 |
| 4,946,898 | 8/1990 | Kasahara et al. | 525/323 |
| 5,081,190 | 1/1992 | Asanuma et al. | 525/323 |
| 5,262,487 | 11/1993 | Fujita et al. | 525/323 |

FOREIGN PATENT DOCUMENTS

| | | |
|---|---|---|
| 0525585 | 2/1993 | European Pat. Off. . |
| 0537368 | 4/1993 | European Pat. Off. . |
| 0601559 | 6/1994 | European Pat. Off. . |

OTHER PUBLICATIONS

Derwent Abstract of JP-A-63 128 045.

*Primary Examiner*—Carman J. Seccuro, Jr.
*Attorney, Agent, or Firm*—Sughrue, Mion, Zinn, Macpeak & Seas

[57] ABSTRACT

A polypropylene resin composition, which exhibits an excellent coating adherence, high rigidity, high impact strength at low temperatures, prominent heat resistance and excellent appearance of moldings as required for coatings on the exterior parts of automobiles even without effecting a treatment with trichloroethane as pretreatment step before coating and without a primer as undercoating and which can be baked at a temperature of 130° C. or higher, comprises 15 to 92% by weight crystalline ethylene propylene block copolymer, 5 to 40% by weight ethylene propylene copolymer rubber, 1 to 15% by weight polypropylene oligomer containing hydroxyl group, and 2 to 30% by weight inorganic filler.

4 Claims, No Drawings

POLYPROPYLENE RESIN COMPOSITION

BACKGROUND OF THE INVENTION

1. Field of the Invention

The present invention relates to a polypropylene resin composition for coating the exterior parts of automobiles which can afford an excellent coating adherence, a high rigidity, high impact strength at low temperatures, prominent heat resistance and an excellent appearance to moldings even without effecting a pretreatment step, i.e., treatment with trichloroethane before coating, in addition without applying a primer as undercoating.

2. Description of the Related Art

Recently automotive parts have been made to have an increasingly thinner wall thickness as an increasingly larger type of automobile having a lighter weight has been manufactured, so that there is a need for coating materials, which enable coatings excellent in heat resistance, impact strength at low temperatures, and in appearance to be produced on moldings without using any primer, and which are also advantageous in cost.

There have been heretofore proposed for such materials numerous compositions comprising a combination of crystalline polypropylenes with rubber and inorganic fillers. However, most exterior automotive parts are likely to be attached in place after painted to have brilliant and high grade perception. Current techniques for the paintings employ the steps of treating moldings with a vapor of 1,1,1-trichloroethane normally for 30 seconds to degrease and etch, then undercoating with a primer, and then applying a polyurethane paint as overcoating.

Japanese Patent KOKAI (Laid-open) No. 63-128045 discloses an improved coating composition comprising a polypropylene polymer composition having an excellent adhesiveness with polyurethanes as overcoating even without using any primer. In this patent, however, a treatment with a vapor of 1,1,1-trichloroethane is required.

The use of 1,1,1-trichloroethane was restricted and decided to be entirely inhibited in 1995, together with the flon gas regulation, by the conference held in London June, 1990. Therefore, coating materials for automotive parts simply having rigidity, strength, heat resistance and impact strength at low temperatures are not sufficient to cope with the regulations unless they allow the treatment with 1,1,1-trichloroethane to be omitted and in addition enhanced coating adherence to be achieved advantageously in cost even without applying any primer. Development of such coating materials has been vigorously sought.

As a result of our intensive research made to overcome the difficulties as described above, it has been found that they can be overcome by using a specific polypropylene resin composition having specific components, based on which the present invention has been completed.

SUMMARY OF THE INVENTION

In view of the aforementioned circumstances in the art, an object of the present invention is to provide a polypropylene resin composition for coating the exterior parts of automobiles which is excellent in coating adherence, rigidity, impact strength at low temperatures, heat resistance and appearance of moldings even omitting any primer as well as a pretreatment step of treating the parts with 1,1,1-trichloroethane before painting.

That is, an object of the present invention is to provide a polypropylene resin composition for coatings to be baked at a temperature of 130° C. or higher comprising 15 to 92% by weight crystalline ethylene propylene block copolymer(A), 5 to 40% by weight ethylene propylene copolymer rubber (B), 1 to 15% by weight polypropylene oligomer containing hydroxyl group (C), and 2 to 30% by weight inorganic filler (D).

Another object of the present invention is to provide a polypropylene resin composition, wherein the crystalline ethylene propylene block copolymer (A) has a moiety of crystalline polypropylene and another moiety of ethylene-propylene random copolymer in a ratio of ethylene/propylene of 20/80 to 60/40 (by weight), said crystalline polypropylene moiety having a limiting viscosity $[\eta]p$ of 0.8 to 2.0 dl/g and a ratio of molecular weight distribution, Q value= weight average molecular weight Mw/number average molecular weight Mn, of 3.0 to 5.0 as determined by GPC, and a content of solubles in xylene at 20° C. of not higher than 1.5% by weight, and said ethylenepropylene random copolymer being present in an amount of 5 to 20% by weight of said crystalline ethylene propylene block copolymer (A).

Still another object of the present invention is to provide a polypropylene resin composition, wherein the ethylene propylene random copolymer rubber (B) has a Mooney viscosity $ML_{1+4}$ measured at 100° C. of 10 to 100 and a content of propylene of 20 to 75% by weight.

Still another object of the present invention is to provide a polypropylene resin composition, wherein the polypropylene oligomer containing hydroxyl group (C) has a molecular weight (Mn) of 2000 to 20000 and a hydroxyl value of 10 to 80.

DETAILED DESCRIPTION OF PREFERRED EMBODIMENTS

The present invention is practically described hereunder.

Crystalline ethylene propylene block copolymers (A) of the present invention may be produced usually by two-step polymerization of propylene and then a mixture of ethylene and propylene in the presence of Ziegler-Natta catalyst, a combination of titanium chloride and an alkyl aluminum compound. In practice of the present invention, it is preferred to use a catalyst comprising a complex of titanium trichloride and magnesium with an electron-donor organic compound. A process of producing this catalyst is described in detail in, for example, Japanese Patent KOKAI No. 61-218606.

The proportion of crystalline ethylene propylene block copolymer (A) to be incorporated in the polypropylene resin composition of the present invention is from 15 to 92% by weight, preferably 25 to 85% by weight. If the proportion is lower than 15% by weight, the resultant moldings may be degraded in appearance, especially flow mark, rigidity, and heat resistance. On the other hand, if the proportion is in excess of 92% by weight, the coated articles may be reduced in impact strength at low temperatures and coating adherence.

The crystalline ethylene propylene block copolymer (A) to be preferably used has a moiety of crystalline polypropylene and another moiety of ethylene-propylene random copolymer in a ratio of ethylene/propylene=20/80 to 60/40 (by weight), said crystalline polypropylene moiety having a limiting viscosity $[\eta]p$ of 0.8 to 2.0 dl/g and a ratio of molecular weight distribution, Q value=weight average molecular weight Mw/number average molecular weight Mn, of 3.0 to 5.0 as determined by GPC and a content of solubles in xylene at 20° C. of not higher than 1.5% by weight, said ethylene-propylene random copolymer being in an amount of 5 to 20% by weight of the crystalline ethylene propylene block copolymer (A).

The ratio in ethylene/propylene of the ethylenepropylene random copolymer moiety should be 20/80 to 60/40, preferably 20/80 to 50/50 by weight. If the amount of ethylene is less than 20% by weight, the composition may have a reduced rigidity and a lower impact strength at low temperatures, while it is over 60% by weight, the impact strength at low temperatures, coating adherence and appearance of moldings, especially flow mark of the resultant composition are degraded.

The proportion of the moiety of ethylene-propylene random copolymer should be from 5 to 20% by weight, preferably 7 to 15% by weight of the crystalline ethylene-propylene block copolymer (A). A proportion of less than 5 by weight results in an reduction in impact strength at low temperatures and coating adherence, while a proportion of higher than 20% by weight results in an reduction in rigidity and heat resistance.

The limiting viscosity $[\eta]p$ should be 0.8 to 2.0 dl/g. If the $[\eta]p$ lower than 0.8 dl/g, the mechanical strength may be reduced, while if it is higher than 2.0 dl/g, the flowability of the composition may markedly be diminished and the appearance, especially flow mark of moldings also may be degraded.

The ratio of molecular weight distribution, Q value should be in the range from 3.0 to 5.0. A Q value of lower than 3.0 may degrade the appearance, especially flow mark of moldings, while the value over 5.0 may produce perceptible weld lines on the injection moldigs of the composition.

The moiety of crystalline polypropylene should have a content of fraction soluble in xylene at 20° C. of not higher than 1.5% by weight, preferably not higher than 1.2% by weight. If the content is in excess of 1.5% by weight, the resultant composition may be degraded in modulus of elasticity and heat resistance.

Ethylene propylene copolymer rubbers (B) to be used in the present invention may be produced by effecting polymerization in a hydrocarbon solvent usually in the presence a catalyst comprising vanadium compounds and organic aluminum compounds. The vanadium compounds to be used include vanadium oxytrichloride, vanadium tetrachloride and vanadate compounds. The organic aluminum compounds to be used include ethyl aluminum sesquichloride and diethyl aluminum chloride.

The polymerization may be conducted in a solvent such as hexane, butane and the like to produce the copolymer rubbers.

As used here, the term "ethylene-propylene copolymer rubber" means copolymers only of ethylene and propylene as well as those of ethylene, propylene and other comonomer, specifically non-conjugated diene, if necessary. The non-conjugated dienes to be used include dicyclopentadiene, 1,4-hexadiene, cyclooctadiene, methylnorbornene, and 5-ethylidene-2-norbornene.

The ethylene propylene copolymer rubbers to be used in the present invention include those produced using titanium based catalysts comprising titanium compounds and organic aluminum compounds as well as copolymers only of ethylene and propylene and those of ethylene, propylene and other comonomers such as non-conjugated dienes.

The ethylene propylene copolymer rubbers may be used in a mixture of two or more types depending upon the flowability, rigidity, heat resistance, impact strength at low temperatures, appearance of moldings, coating adherence and the like to be improved.

The Mooney viscosity $ML_{1+4}$ measured at 100° C. of ethylene propylene copolymer rubbers (B) used in the present invention should be in the range of 20 to 100, preferably 20 to 85. A Mooney viscosity of less than 20 may result in reduced impact strength and degraded appearance of moldings, particularly weld irregularity. A Mooney viscosity in excess of 100 may result in an reduction in the adherence of coatings onto articles. The amount of propylene in the ethylene propylene copolymer rubbers should be in the range from 20 to 75% by weight. If it is less than 20% by weight, the coating adherence may be lowered, while if it is over 75% by weight, the rigidity and heat resistance may be reduced.

When a small amount of non-conjugated diene monomer is copolymerized with ethylene propylene copolymer rubbers, an iodine value of higher than 20 may lead to degraded appearance of moldings, particularly flow mark.

The proportion of the ethylene propylene copolymer rubbers (B) to be incorporated in the polypropylene resin composition of the present invention should be in the range from 5 to 40% by weight, preferably 10 to 35% by weight. If it is lower than the defined range, the impact strength at low temperatures and coating adherence may be reduced. If it is higher than the defined range, the rigidity, heat resistance, coating adherence onto moldings, and appearance, especially flow mark may be degraded.

Polypropylene oligomers having hydroxyl group (C) to be used in the present invention should have a molecular weight (Mn) of 2000 to 20000 and a hydroxyl value of 10 to 80. Materials corresponding to such oligomers include those available from Sanyo Kasei Co. under the registered tradename "YOUMEX" 1201H and YOUMEX 1210.

The proportion of the polypropylene oligomers having hydroxyl group (C) to be incorporated in the polypropylene resin composition of the present invention should be in the range from 1 to 15% by weight, preferably 1 to 12% by weight. A proportion of less than 1% by weight may reduce the coating adherence, while that exceeding 15% by weight may result in reduced coating adherence and impact strength at low temperatures.

The inorganic fillers (D) to be used in the present invention include talc, mica, wollastonite, calcium carbonate, barium sulfate, magnesium carbonate, clay, alumina, silica, calcium sulfate, carbon fibers, metal fibers, siliceous sand, quartzite, carbon black, titanium oxide, magnesium hydroxide, asbestos, zeolite, molybdenum, diatomaceous earth, sericite, SHILAS, calcium hydroxide, calcium sulfite, sodium sulfate, bentonite and graphite.

The proportion of inorganic fillers (D) to be incorporated in the polypropylene resin composition of the present invention should be in the range from 2 to 30% by weight, preferably 2 to 25% by weight. A proportion of less than 2% by weight may cause a reduction in heat resistance, while that exceeding 30% by weight may cause degradation in impact strength, appearance of moldings, and coating adherence.

The inorganic fillers (D) should preferably be talc particles having an average particle size of 3μ or less in order to improve the rigidity, impact strength at low temperatures, and appearance of moldings.

According to the present invention, the use of a paint-baking temperature of 130° C. or higher allows overcoating to be tightly adhered onto the surfaces of parts. In addition, sufficient baking time, for example, of not less than 20 minutes allows tight adherence of overcoating onto the surfaces even without undercoating primer.

The resin composition of the present invention may be prepared by using a kneading apparatus such as a single or twin screw extruder, Banbury mixer, or hot rollers. The temperature required for the kneading should be in the range from 160° to 260° C. for 1 to 20 minutes. Moreover, in the kneading step, there may be incorporated at least one of additives such as antioxidant, UV absorbers, slipping agents, pigments, antistatic agents, copper harm inhibitors, flame retardants, neutralizing agents, foaming agents, plasticizers, nucleating agents and the like in the range that the objects of the present invention are not inhibited.

EXAMPLES

The present invention will be illustrated with reference to Examples and Comparative Examples hereunder, without being limited thereto, so long as they are not exceeding the gist of the present invention.

First, procedures for measurement of physical properties referred to in Examples and Comparative Examples are described.

(1) Melt flow rate

According to the procedure defined in JIS K6758. Measurement was made at a temperature of 230° C. under a load of 2.16 kg unless otherwise indicated.

(2) Tensile test

According to the procedure defined in ASTM D638. Specimens obtained by injection molding were used. The specimens had a thickness of 3.2 mm and evaluated for tensile yield point strength. The temperature was 23° C. unless otherwise indicated.

(3) Flexure test

According to the procedure defined in JIS K7203. Specimens obtained by injection molding were used. The specimens had a thickness of 6.4 mm and a span length of 100 mm and evaluated for modulus of flexural elasticity and flexure strength at a loading speed of 2.0 mm/minute. The temperature was 23° C. unless otherwise indicated. When the specimens were at other temperatures, they were conditioned for 30 minutes in a thermostat at a predetermined temperature before measuring.

(4) Izot impact strength

According to the procedure defined in JIS K7110. Specimens obtained by injection molding were used. The specimens had a thickness of 6.4 mm and evaluated for notched impact strength after molded and notched. The temperature was 23° C. unless otherwise indicated. When the specimens were at other temperatures, they were conditioned for 2 hours in a thermostat at a predetermined temperature before measuring.

(5) Deflection test under load

According to the procedure defined in JIS K7207. The fiber stress was measured at 4.6 kg/cm².

(6) Appearance

A plate having dimensions of 100 mm wide×400 mm long×3 mm thick was used, and articles molded by single point side gate from one side of the 100 mm width were evaluated for flow mark by naked eye. In addition, articles molded by two point side gate from one side of the 100 width were evaluated for weld appearance by naked eye.

Evaluations of the flow mark and the weld appearance were rated by the figure "◯" for unperceptible and the figure "X" for perceptible.

(7) Coatability

Evaluation of appearance was made for the identical plates to those which had been used for the evaluation of flow mark. Specimens used were prepared only by air-blowing without pretreatment after shaping and leaving to stand for one day. The plates used for evaluating coating quality were prepared with careful attention to avoid leaving fingerprint and depositing a releasing agent. Coating was made using a spray gun to apply a two-parts urethane paint available from NIPPON BEE CEMICAL Co., Ltd. under the tradename "R271" to a thickness of 35 to 40μ, then baked by a drier at 145° C. for 30 minutes, allowed to stand for one day at room temperature, and then each specimen was subjected to the adherence test. The adherence test was made according to the cross cut adhesion test where a adhesive tape available from Nichiban Co. under the tradename "Cellotape" having a width of 24 mm was attached on the 1 mm square cross cut surface and peeled off at an angle of 90° to determine the proportion (%) of the squares remained intact.

Components A, B, C, and D used in Examples and Comparative Examples were summarized in Tables 1 to 4 under.

TABLE 1

| | Crystalline ethylene propylene block copolymer (A) | | | | |
|---|---|---|---|---|---|
| | Crystalline polypyropylene moiety | | | Ethylene propylene random copolymer moiety | |
| | $[\eta]p$ | Q value | Xylene solubles (% by weight) | Amount in the copolymer (A) (% by weight) | Ethylene/ propylene (by weight) |
| PP-1 | 1.02 | 3.5 | 0.9 | 12 | 28/72 |
| PP-2 | 0.70 | 3.4 | 0.9 | 11.5 | 30/70 |
| PP-3 | 1.25 | 7.1 | 1.3 | 16 | 28/72 |
| PP-4 | 0.98 | 3.5 | 2.1 | 16 | 38/62 |
| PP-5 | 1.20 | 3.6 | 0.9 | 1 | 42/58 |
| PP-6 | 1.11 | 3.7 | 1.0 | 25 | 38/62 |
| PP-7 | 1.15 | 3.6 | 1.0 | 17 | 70/30 |
| PP-8 | 2.31 | 3.7 | 1.1 | 12 | 30/70 |

TABLE 2

| | Ethylene propylene copolymer rubber (B) | | | |
|---|---|---|---|---|
| No. | $ML_{1,4}$ at 100° C. | Amount of propylene | Iodine value | Catalyst |
| EPR-1 | 45 | 28 | — | Vanadium |
| EPR-2 | 30 | 45 | — | Vanadium |
| EPR-3 | 30 | 30 | 18 (ENB) | Vanadium |
| EPR-4 | 77 | 45 | 10 (ENB) | Vanadium |
| EPR-5 | 30 | 68 | — | Titanium |
| EPR-6 | 120 | 30 | 1 (ENB) | Vanadium |
| EPR-7 | 55 | 15 | — | Vanadium |

TABLE 3

| | Polypropylene oligomer having hydroxyl group (C) | | |
|---|---|---|---|
| Tradename | Molecular weight (Mn) | Hydroxyl value | Specific gravity |
| YOUMEX 120H (available from Sanyo Kasei Co., Ltd.) | 12000 | 21.5 | 0.95 |
| YOUMEX 1210 (available from Sanyo Kasei Co., Ltd.) | 4000 | 50 | 0.95 |
| YOUMEX 1215 (available from Sanyo Kasei Co., Ltd.) | 3000 to 3500 | 75 | 0.95 |

TABLE 4

| Inorganic filler (D) | |
|---|---|
| Filler | Average particle size (μm) |
| Talc - A | 2.2 |
| Talc - B | 4.1 |
| Calcium carbonate | 1.9 |
| Settling barium sulfate | 0.8 |
| Wollastonite | 8.2 |

Examples 1 to 11 and Comparative Examples 1 to 15

Components A to D were formulated as indicated in Tables 6 and 8, blended by a Henschel mixer, and then melt-kneaded with a 44 mm twin screw extruder at 220° C. to produce pellets. The pellets were injection molded under molding conditions A and B shown in Table 5 to produce test specimens and plates as samples for evaluation. The results of evaluation are given in Tables 7 and 9.

TABLE 5

| | Conditins of preparing samples for evaluation | |
|---|---|---|
| | Molding condition A | Molding condition B |
| Injection molding machine | Toshiba IS150E (available Toshiba Machine Co., Ltd.) | NEOMAT 515/150 (available from Sumitomo Heavy Industries, Ltd.) |
| Mold | Test specimen Specimen for tensile test Specimen for flexure test Specimen for Izod impact test | Plate, 100 × 400 × 3 m/m Single point or two point gate |
| Temperature | 220° C. | 220° C. |
| Primary pressure, time | 550 kg/cm$^2$, 5 sec. | 700 kg/cm$^2$, 5 sec. |
| Secondary pressure, time | 300 kg/cm$^2$, 10 sec. | 500 kg/cm$^2$, 10 sec. |
| Cooling time | 30 sec. | 30 sec. |
| Temperature of metal mold | 50° C. | 50° C. |
| Screw revolution | 87 rpm. | 80 rpm. |

TABLE 6

| | Formation | | | | | | | |
|---|---|---|---|---|---|---|---|---|
| | Component A | Parts by weight | Component B | Parts by weight | Component C | Parts by weight | Component D | Parts by weight |
| | | | | | YOUMEX | | | |
| Example 1 | PP-1 | 60 | EPR-1 | 30 | 1201H | 5 | Talc-A | 5 |
| Comp. Ex. 1 | PP-2 | 60 | EPR-1 | 30 | 1201H | 5 | Talc-A | 5 |
| Comp. Ex. 2 | PP-3 | 60 | EPR-1 | 30 | 1201H | 5 | Talc-A | 5 |
| Comp. Ex. 3 | PP-4 | 60 | EPR-1 | 30 | 1201H | 5 | Talc-A | 5 |
| Comp. Ex. 4 | PP-5 | 60 | EPR-1 | 30 | 1201H | 5 | Talc-A | 5 |
| Comp. Ex. 5 | PP-6 | 60 | EPR-1 | 30 | 1201H | 5 | Talc-A | 5 |
| Comp. Ex. 6 | PP-7 | 60 | EPR-1 | 30 | 1201H | 5 | Talc-A | 5 |
| Comp. Ex. 7 | PP-8 | 60 | EPR-1 | 30 | 1201H | 5 | Talc-A | 5 |
| Comp. Ex. 8 | PP-1 | 90 | — | — | 1201H | 5 | Talc-A | 5 |
| Comp. Ex. 9 | PP-1 | 30 | EPR-1 | 60 | 1201H | 5 | Talc-A | 5 |
| Comp. Ex. 10 | PP-1 | 65 | EPR-1 | 30 | — | — | Talc-A | 5 |
| Comp. Ex. 11 | PP-1 | 45 | EPR-1 | 30 | 1201H | 20 | Talc-A | 5 |
| Comp. Ex. 12 | PP-1 | 65 | EPR-1 | 30 | 1201H | 5 | — | — |
| Comp. Ex. 13 | PP-1 | 25 | EPR-1 | 30 | 1201H | 5 | Talc-A | 40 |

TABLE 7

|  | Melt flow rate (g/10 min.) | Tensile strength (MPa) | Elongation (%) | Modulus of flexural elasticity (MPa) | Flexure strength (MPa) | Izod impact strength at 23° C. (J/m) |
|---|---|---|---|---|---|---|
| Example 1 | 15 | 20.0 | >500 | 1170 | 22.1 | NB* |
| Comp. Ex. 1 | 34 | 21.6 | 160 | 1290 | 23.5 | 255 |
| Comp. Ex. 2 | 9.8 | 19.1 | 110 | 1030 | 20.6 | NB |
| Comp. Ex. 3 | 13 | 18.6 | >500 | 880 | 19.9 | NB |
| Comp. Ex. 4 | 10.5 | 23.0 | φ400 | 1390 | 25.0 | 186 |
| Comp. Ex. 5 | 12 | 18.6 | >500 | 880 | 20.1 | NB |
| Comp. Ex. 6 | 11 | 20.6 | >500 | 1170 | 23.1 | 285 |
| Comp. Ex. 7 | 1.3 | 19.6 | >500 | 1030 | 21.0 | NB |
| Comp. Ex. 8 | 28 | 29.9 | 80 | 1780 | 42.7 | 62 |
| Comp. Ex. 9 | 0.5 | 5.9 | >500 | 206 | 6.9 | NB |
| Comp. Ex. 10 | 14 | 20.6 | >500 | 1200 | 22.6 | NB |
| Comp. Ex. 11 | 17 | 18.6 | 350 | 1080 | 19.6 | 265 |
| Comp. Ex. 12 | 16 | 18.1 | >500 | 840 | 19.1 | NB |
| Comp. Ex. 13 | 4.3 | 16.7 | 125 | 2600 | 20.6 | 108 |

|  | Izod impact strength at −30° C. (J/m) | Temperature of deflection under load (°C.) | Flow mark | Weld | Coating adherence (%) |
|---|---|---|---|---|---|
| Example 1 | 93 | 107 | ○ | ○ | 100 |
| Comp. Ex. 1 | 52 | 110 | ○ | ○ | 95 |
| Comp. Ex. 2 | 140 | 105 | ○ | X | 85 |
| Comp. Ex. 3 | 83 | 95 | ○ | ○ | 90 |
| Comp. Ex. 4 | 48 | 112 | ○ | X | 20 |
| Comp. Ex. 5 | 265 | 98 | X | ○ | 90 |
| Comp. Ex. 6 | 50 | 104 | X | ○ | 20 |
| Comp. Ex. 7 | NB | 103 | X | X | 100 |
| Comp. Ex. 8 | 32 | 138 | ○ | ○ | 0 |
| Comp. Ex. 9 | NB | —* | X | X | 40 |
| Comp. Ex. 10 | 89 | 108 | ○ | ○ | 30 |
| Comp. Ex. 11 | 50 | 101 | X | X | 30 |
| Comp. Ex. 12 | 88 | 98 | ○ | ○ | 80 |
| Comp. Ex. 13 | 34 | 109 | X | X | 90 |

*Couldn't be measured

TABLE 8

|  | Formation | | | | | | | |
|---|---|---|---|---|---|---|---|---|
|  | Component A | Parts by weight | Component B | Parts by weight | Component C | Parts by weight | Component D | Parts by weight |
|  |  |  |  |  | YOUMEX |  |  |  |
| Example 2 | PP-1 | 60 | EPR-2 | 30 | 1201H | 5 | Talc-A | 5 |
| Example 3 | PP-1 | 60 | EPR-3 | 30 | 1201H | 5 | Talc-A | 5 |
| Example 4 | PP-1 | 60 | EPR-4 | 30 | 1201H | 5 | Talc-A | 5 |
| Example 5 | PP-1 | 60 | EPR-5 | 30 | 1201H | 5 | Talc-A | 5 |
| Comp. Ex. 14 | PP-1 | 60 | EPR-6 | 30 | 1201H | 5 | Talc-A | 5 |
| Comp. Ex. 15 | PP-1 | 60 | EPR-7 | 30 | 1201H | 5 | Talc-A | 5 |
| Example 6 | PP-1 | 60 | EPR-1 | 30 | 1210 | 5 | Talc-A | 5 |
| Example 7 | PP-1 | 60 | EPR-1 | 30 | 1201H | 5 | Talc-B | 5 |
| Example 8 | PP-1 | 60 | EPR-1 | 30 | 1201H | 5 | Calcium carbonate | 5 |
| Example 9 | PP-1 | 60 | EPR-1 | 30 | 1201H | 5 | Precipitated barium sulfate | 5 |
| Example 10 | PP-1 | 60 | EPR-1 | 30 | 1201H | 5 | Wollastonite | 5 |
| Example 11 | PP-1 | 60 | EPR-1 | 30 | 1215 | 4 | Talc-A | 5 |

TABLE 9

|  | Melt flow rate (g/10 min.) | Tensile strength (MPa) | Elongation (%) | Modulus of flexural elasticity (MPa) | Flexure strength (MPa) | Izod impact strength at 23° C. (J/m) |
|---|---|---|---|---|---|---|
| Example 2 | 11 | 15.2 | >500 | 980 | 17.2 | NB* |
| Example 3 | 10 | 18.6 | >500 | 1030 | 20.1 | NB |
| Example 4 | 12 | 17.7 | >500 | 980 | 18.8 | NB |
| Example 5 | 9 | 17.7 | >500 | 1030 | 20.6 | NB |
| Comp. Ex. 14 | 5.3 | 18.6 | >500 | 1060 | 20.1 | NB |

TABLE 9-continued

| | | | | | | |
|---|---|---|---|---|---|---|
| Comp. Ex. 15 | 13 | 22.1 | 180 | 1300 | 24.0 | 284 |
| Example 6 | 16 | 19.5 | >500 | 1140 | 21.5 | NB |
| Example 7 | 11 | 19.6 | >500 | 1080 | 21.6 | NB |
| Example 8 | 14 | 17.9 | >500 | 96020.1 | NB | |
| Example 9 | 17 | 18.6 | >500 | 950 | 19.6 | NB |
| Example 10 | 16 | 19.1 | >500 | 1000 | 20.6 | NB |
| Example 11 | 16 | 19.0 | >500 | 1150 | 21.0 | NB |

| | Izod impact strength at −30° C. (J/m) | Temperature of deflection under load (°C.) | Flow mark | Weld | Coating adherence (%) |
|---|---|---|---|---|---|
| Example 2 | 128 | 100 | ○ | ○ | 100 |
| Example 3 | 98 | 105 | ○ | ○ | 100 |
| Example 4 | 72 | 100 | ○ | ○ | 100 |
| Example 5 | 118 | 104 | ○ | ○ | 100 |
| Comp. Ex. 14 | 123 | 107 | X | ○ | 20 |
| Comp. Ex. 15 | 53 | 113 | ○ | ○ | 10 |
| Example 6 | 98 | 106 | ○ | ○ | 100 |
| Example 7 | 78 | 105 | ○ | ○ | 100 |
| Example 8 | 226 | 100 | ○ | ○ | 100 |
| Example 9 | 186 | 100 | ○ | ○ | 100 |
| Example 10 | 137 | 102 | ○ | ○ | 100 |
| Example 11 | 96 | 105 | ○ | ○ | 100 |

*NB: none break

As described above, the present invention provides a polypropylene resin composition which exhibits an excellent coating adherence, high rigidity, high impact strength at low temperatures, prominent heat resistance and excellent appearance of moldings as required for coatings on the exterior parts of automobiles even without effecting a treatment with trichloroethane as pretreatment step before coating and without a primer as undercoating.

What is claimed is:

1. A polypropylene resin composition for coatings to be baked at a temperature of 130° C. or higher comprising 15 to 92% by weight crystalline ethylene propylene block copolymer (A), 5 to 40% by weight ethylene propylene copolymer rubber (B), 1 to 15% by weight polypropylene oligomer containing hydroxyl group (C), and 2 to 30% by weight inorganic filler (D);

wherein said crystalline ethylene propylene block copolymer (A) has a moiety of crystalline polypropylene and another moiety of ethylene-propylene random copolymer in a ratio of ethylene/propylene of 20/80 to 60/40 by weight, said crystalline polypropylene moiety having a limiting viscosity (η)p of 0.8 to 2.0 dl/g and a ratio of molecular weight distribution, Q value=weight average molecular weight Mw/number average molecular weight Mn, of 3.0 to 5.0 as determined by GPC, and a content of solubles in xylene at 20° C. of not higher than 1.5% by weight, and said ethylene-propylene random copolymer being present in an amount of 5–20% by weight of said crystalline ethylene propylene block copolymer (A); and wherein said ethylene propylene copolymer rubber (B) has a Mooney viscosity $ML_{1+4}$ measured at 100° C. of from 20 to 100 and a propylene content of from 20 to 75% by weight of said ethylene propylene copolymer rubber (B).

2. The polypropylene resin composition according to claim 1, wherein said ethylene propylene copolymer rubber (B) has a Mooney viscosity $ML_{1+4}$ measured at 100° C. of 20 to 85.

3. The polypropylene resin composition according to claim 1, wherein said polypropylene oligomer containing hydroxyl group (C) has a molecular weight (Mn) of 2000 to 20000 and a hydroxyl value of 10 to 80.

4. The polypropylene resin composition according to claim 1, wherein said inorganic filler (D) has a average particle size of 3μ or less.

* * * * *